(12) United States Patent
Ozdemir (10) Patent No.: US 8,135,928 B2
(45) Date of Patent: Mar. 13, 2012

(54) SELF-ADJUSTING CHANGE TRACKING FOR FAST RESYNCHRONIZATION

(75) Inventor: Kadir Ozdemir, San Jose, CA (US)

(73) Assignee: Symantec Operating Corporation, Mountain View, CA (US)

( * ) Notice: Subject to any disclaimer, the term of this patent is extended or adjusted under 35 U.S.C. 154(b) by 311 days.

(21) Appl. No.: 12/605,544

(22) Filed: Oct. 26, 2009

(65) Prior Publication Data

US 2011/0099343 A1    Apr. 28, 2011

(51) Int. Cl.
*G06F 12/00* (2006.01)
(52) U.S. Cl. ........ 711/156; 711/114; 711/161; 711/162; 711/170
(58) Field of Classification Search .................. None
See application file for complete search history.

(56) References Cited

U.S. PATENT DOCUMENTS

| 7,366,857 B2 | 4/2008 | Cochran et al. |
| 7,657,578 B1 | 2/2010 | Karr et al. |
| 7,707,372 B1 | 4/2010 | Kumar et al. |

FOREIGN PATENT DOCUMENTS

WO    2005064468 A1    7/2005

*Primary Examiner* — Shawn X Gu
(74) *Attorney, Agent, or Firm* — Meyertons Hood Kivlin Kowert & Goetzel, P.C.; Jeffrey C. Hood (57) ABSTRACT

System and method for tracking changes to a volume. A write request to write data to a first location in the volume may be received. It may be determined if the first location is overlapping with or adjacent to one or more locations of earlier write requests to the volume. First location information may be stored in a data structure in response to determining that the first location is overlapping with or adjacent to one or more second locations of earlier write requests to the volume. The first location information may identify the first location and the one or more second locations. Second location information may be removed from the data structure, where the second location information identifies the one or more second locations of earlier write requests to the volume. The data may be written to the first location in the volume in response to the write request.

20 Claims, 5 Drawing Sheets

FIG. 5B

SELF-ADJUSTING CHANGE TRACKING FOR FAST RESYNCHRONIZATION

FIELD OF THE INVENTION

The present invention relates generally to computer systems and more particularly to a self-adjusting system and method for tracking changes to a volume.

DESCRIPTION OF THE RELATED ART

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Data storage required for applications such as file systems and databases are typically allocated from one or more storage devices that are maintained as a "volume". The "volume" may serve as a logical interface used by an operating system to access data stored on one or more storage media using a single instance of a file system. Thus, a volume may act as an abstraction that essentially "hides" storage allocation and (optionally) data protection/redundancy from the application. An application can store its data on multiple volumes. For example, such multivolume applications may utilize one or more volumes for storing user data and a separate volume for its transaction logging. The set of volumes used by a single application may be referred to as the volume group of the application.

Computer systems, and their components, are subject to various types of failures which may result in the loss of data. For example, a storage device used in or by the computer system may experience a failure (e.g. mechanical, electrical, magnetic, etc.) which may make any data stored on that storage device unreadable. Erroneous software or hardware operation may corrupt the data stored on a storage device, destroying the data stored on an otherwise properly functioning storage device. Any component in the storage chain between (and including) the storage device and the computer system may experience failure (e.g. the storage device, connectors (e.g. cables) between the storage device and other circuitry, the network between the storage device and the accessing computer system (in some cases), etc.).

Given the possibility of such system and component failures, it is frequently desirable that data be stored with a high degree of availability. For example, mirroring and parity based redundancy techniques, e.g., RAID1 and RAID5, are used extensively in data centers to protect data against storage media and component failures. Data stored on volumes which utilize such techniques may still be available even if a single drive undergoes a failure or disconnection.

When data is redundantly stored on multiple disks that constitute a RAID volume, the content of these disks must be consistent all the time. However, under certain failures, a disk can be detached from the volume and the data on that disk can become stale. In addition, administrative operations can also detach a disk or take it offline. When a detached disk is attached back to the volume later, its content needs to resynchronized with the volume. This process is called resynchronization. If the volume is never written to during the time the disk is detached, then the disk does not require resynchronization. Otherwise, the resynchronization process needs to make sure that every block on the disk is consistent with the other disks of the volume. There are a number of possible approaches to resynchronization.

A straightforward approach is to read the entire content of the volume to reconstruct the content of the disk. This process can take hours or even days to complete. Therefore, it is a common practice to keep track of changes to the volume while a disk is detached, and then resynchronize only the changed blocks when the disk is attached. Although keeping track of changed blocks can radically reduce the time and resources required to resynchronize a disk, it brings the overhead of persisting this change information for possibly each update on the volume.

Striking a balance between reducing the overhead on the regular volume updates and having an efficient resynchronization process is thus a challenging problem. One approach to this problem is to maintain a bitmap for each detached disk where a separate bit is allocated for each block or fixed sized region. Bitmaps are simple to implement. However, they do not scale and do not handle random updates well. The size of a bitmap has to be proportional with the size of its volume. When the system manages large amount of storage space, keeping bitmaps in memory may not be feasible. When a volume is updated randomly, the bitmap will be updated randomly too. It is likely that the updates to the bitmap will not be coalesced and every bit update in memory will result in a separate I/O request to update the corresponding bit on disk. Since the bitmap has to be updated before the volume for possibly each write operation on the volume, the bitmap overhead degrades the volume performance by impacting write I/O latency and throughput. The only way to reduce the bitmap size is to increase per bit region size. However, this may lead to longer resynchronization, as a single block update to a region is sufficient to set the corresponding bit in the bitmap, which requires resynchronizing its entire region.

Accordingly, improvements in systems for change tracking for resynchronization purposes, e.g., which address these scalability and performance issues, would be desirable.

SUMMARY OF THE INVENTION

Embodiments are presented of a system and method for tracking changes to a volume for fast resynchronization.

One set of embodiments includes a computer-readable storage medium comprising program instructions and associated method for replicating data. The program instructions/method may be executable to perform the following steps. A write request may be received to write data to a first location in the volume. The method may determine if the first location is overlapping with or adjacent to one or more locations of earlier write requests to the volume that have not been replicated to a secondary storage. First location information may be stored in a data structure in response to determining that the first location is overlapping with or adjacent to one or more second locations of earlier write requests to the volume that have not been replicated to a secondary storage. The first location information may identify the first location and the one or more second locations. As part of storing the first location information in the data structure, second location information in the data structure may be removed from the data structure. The second location information may identify the one or more second locations of earlier write requests to the volume that have not been replicated to a secondary storage. The data may be written to the first location in the volume in response to the write request.

In some embodiments, the program instructions/method may be further executable to store third location information in the data structure in response to determining that the first location is not overlapping with or adjacent to one or more locations of earlier write requests to the volume that have not been replicated to a secondary storage. The third location information may identify the first location.

In some embodiments, the data structure may include a plurality of entries. Each entry may include location information identifying a location in the volume to which one or more writes have been performed that have not been replicated to the secondary storage.

In some embodiments, distance information may be stored in a second data structure. The distance information in the second data structure may indicate distances between locations identified by entries in the first data structure.

In some embodiments, the program instructions/method may be further executable to merge two entries in the data structure. The two entries to be merged may identify a second location and a third location in the volume. Merging the two entries may include removing each entry from the data structure and storing a new entry in the data structure, where the new entry identifies a fourth location in the volume. The fourth location may include the second and third locations.

In some embodiments, the merged two entries may be determined based on a distance between the second and third locations in the volume.

In some embodiments, the program instructions/method may be executable to merge the two entries in the data structure in response to the write request to write data to the first location in the volume, in order to vacate an entry in the data structure in which to store location information corresponding to the write request.

In some embodiments, each entry in the data structure may also store log information for the location information in the entry. The log information may indicate a section of a change log in the volume in which a record reflecting the entry is stored. The change log may include one or more sections. The program instructions/method may also be further executable to perform the following steps. A first section of the change log, to which to write the first location information, may be determined. The first location information may be written to the first section of the change log. First log information for the first location information in the data structure may be stored. The first log information may indicate that the first location information is reflected in the first section of the change log.

In some embodiments, if the first section of the change log is full, one or more records may be flushed from the first section of the change log. Flushing may include removing any records which no longer reflect entries in the data structure from the first section of the change log.

In some embodiments, in determining a first section of the change log to which to write the first location information, it may be determined that the first section of the change log is a section of the change log in which fewest records reflect entries in the data structure.

In a further set of embodiments, a system for replicating data is contemplated. The system may include one or more processors and a computer readable storage medium. The computer readable storage medium may include program instructions executable by the one or more processors to perform the operations described above.

Embodiments of this disclosure may provide a way to efficiently keep track of changes to a volume in order to minimize the amount of data that needs to be resynchronized in a resynchronization operation. It is noted that for many resynchronization operations, change tracking does not need to be exactly accurate as long as all changed areas to which changes have been made are identified. Also, resynchronization can typically apply pending changes in any order as long as at the end of the process the content to be synchronized becomes consistent with the volume content. Many of the embodiments disclosed herein leverage these observations to produce a self-adjusting logging mechanism whose data structures are always fully contained in the available memory, whose false positives are minimized, and whose on-disk data format is logged structured.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Computer System." This term has its ordinary and accepted meaning in the art. In general, the term "computer system" can be broadly defined to encompass any device (or combination of devices) having at least one processor that executes instructions from a memory medium. The term "computer system" includes one or more computer systems (or computing devices) operating together and any software stored thereon.

"Storage Medium." This term has its ordinary and accepted meaning in the art, and includes any of various types of memory/storage. The term "storage medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The storage medium may comprise other types of memory as well, or combinations thereof. In addition, the storage medium may be located in a first computer in which the programs are executed, and/or may be located in a second different computer which connects to the first computer over a network, such as the Internet. In the latter instance, the second computer may provide program instructions to the first computer for execution. The term "storage medium" may include two or more storage media which may reside in different locations, e.g., in different computers that are connected over a network.

"Storage Device." This term has its ordinary and accepted meaning in the art, which includes a device comprising a Storage Medium that stores data generated by a computer system.

"Logging." This term refers broadly to the insertion of information into a log (which is used broadly to refer to a set of information being stored, e.g., in a data structure or dedicated memory). For example, a device may log write operations as they are performed by storing information about the write operations to a predetermined location.

Figure 1:
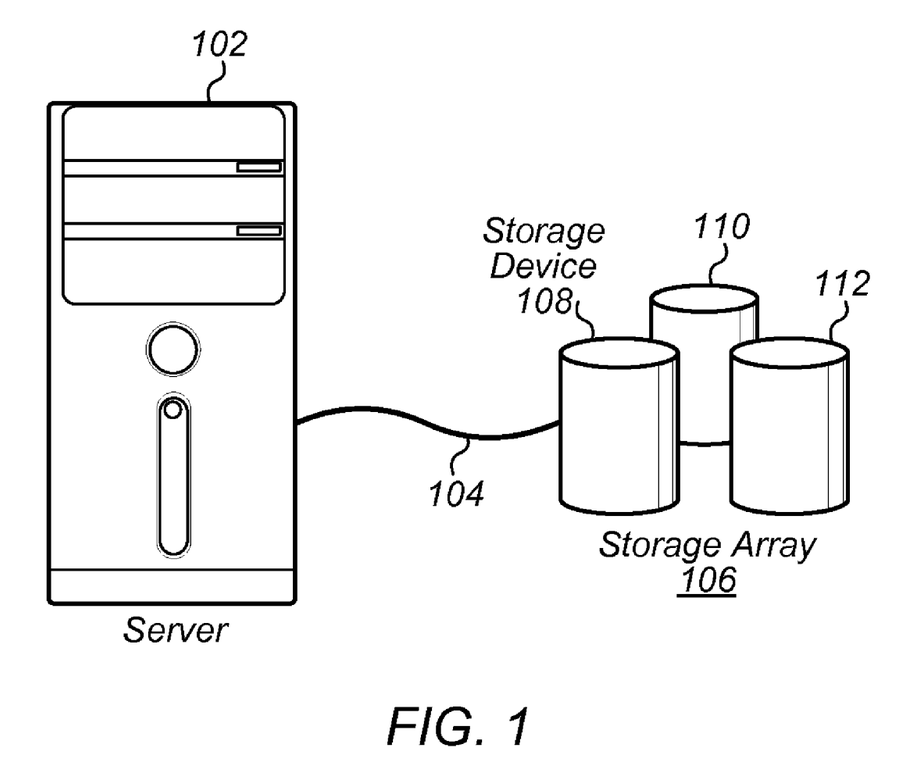
FIG. 1 is a block diagram illustrating a server connected to a storage array according to one embodiment.

FIG. 1—Server Connected to a Storage Array

FIG. 1 is a block diagram illustrating a server connected to a storage array. As shown, there may be a server 102 connected to a storage array 106 over a connection 104. Storage array 106 may itself be composed of two or more storage devices. For example, storage array 106 may be composed of storage devices 108, 110, and 112, as shown in FIG. 1. Alternatively, storage array 104 may be composed of any number of storage devices, as desired. The storage devices that make up storage array 104 may be any type of storage devices, e.g., disk drives, tape drives, optical storage, or any other type of storage device, or some combination thereof. Storage array 104 may form a single logical volume.

The connection 104 may be a direct connection, or may an indirect connection; for example, connection 104 may be made over one or more of any of various types of networks, for example, a local area network (LAN), a storage area network (SAN), and/or a wide area network (WAN). Such a network connection may be wired or wireless. While only server 102 and storage array 106 are shown, there may also be other systems (e.g. computer systems) and/or devices also connected (e.g., either directly or through a network) to either or both of server 102 and storage array 106; alternatively, the system may only include the server 102 and the storage array 106.

In some embodiments, the storage array 106 may utilize one or more redundancy techniques, such as mirroring, parity, or any other redundancy technique, to improve availability of the data stored in storage array 106. Thus, it may be possible to detach one (or more) of the storage devices from storage array 106 (for example, due to a failure, administrative operations, or for any other reason) without losing availability of any of the data stored in storage array 106. However, if the detached storage device is re-attached to storage array 106, the re-attached storage device may need to be resynchronized to the other storage devices in the storage array.

Thus, as shown, the server 102 may include a synchronization module 330. The synchronization module 330 may be adapted to implement embodiments of the present disclosure, e.g., to track changes to a volume for resynchronization.

While the detailed description below may refer to embodiments using servers, such as those shown in FIG. 1 and described herein, it should be noted that embodiments of the system and method described herein may be performed with any computer systems, and may not be limited to server computer systems.

Figure 2:
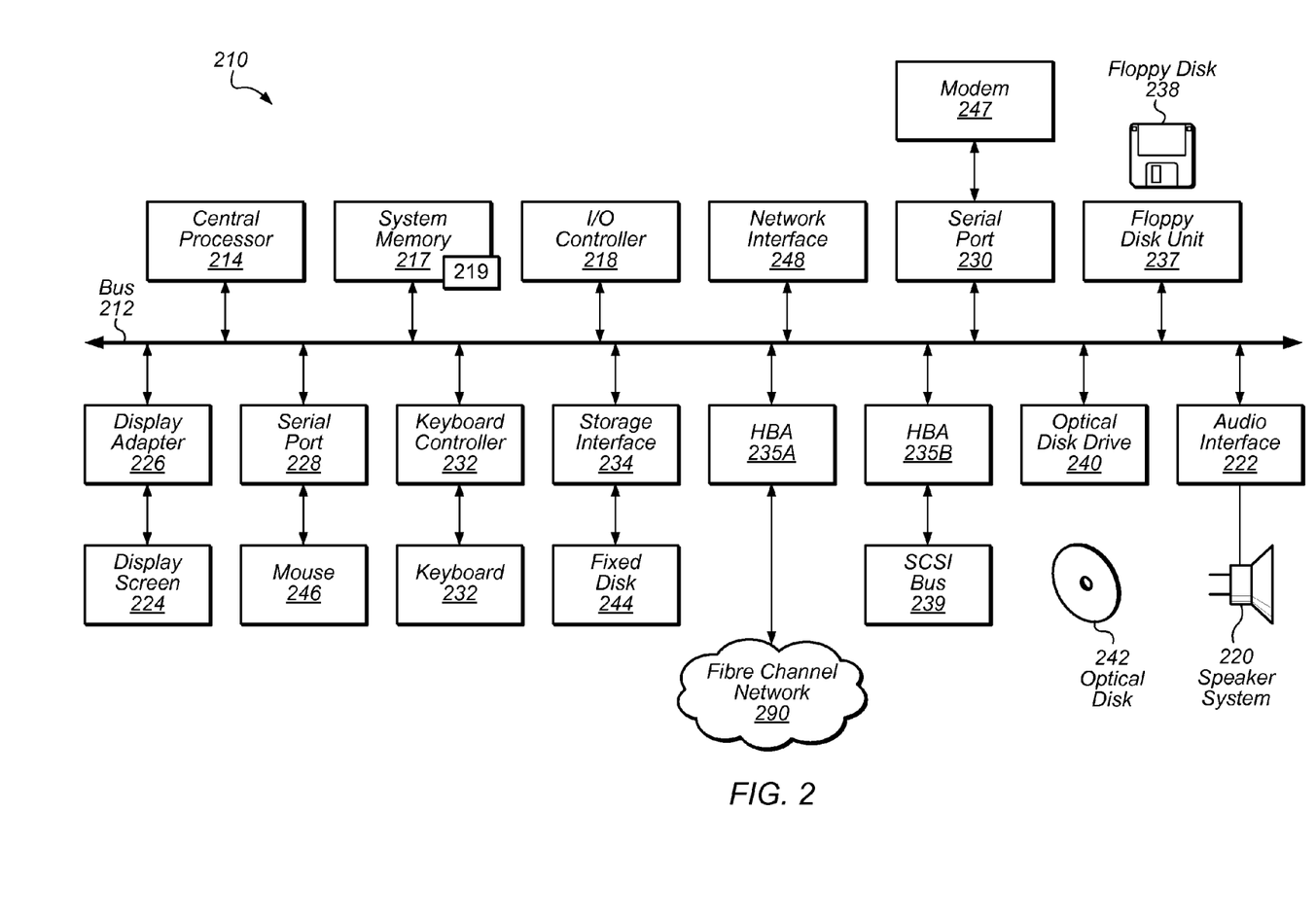
FIG. 2 is an exemplary block diagram illustrating a computer system according to one embodiment.

FIG. 2—Exemplary Computer System Block Diagram

FIG. 2 depicts a block diagram of a computer system 210 suitable for implementing the present disclosure. For example, server 102 shown in FIG. 1 could be implemented as computer system 210 according to some embodiments. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application.

Code to implement embodiments of the present disclosure can be stored in computer-readable storage media such as one or more of system memory 217, fixed disk 244, optical disk 242, or floppy disk 238. The operating system provided on computer system 210 may be MS-DOS®, MS-WIN-DOWS®, OS/2®, UNIX®, Linux®, or another known operating system. In the exemplary embodiment shown in FIG. 2, code 219 which implements embodiments of the present disclosure is shown as being comprised in System Memory 217.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
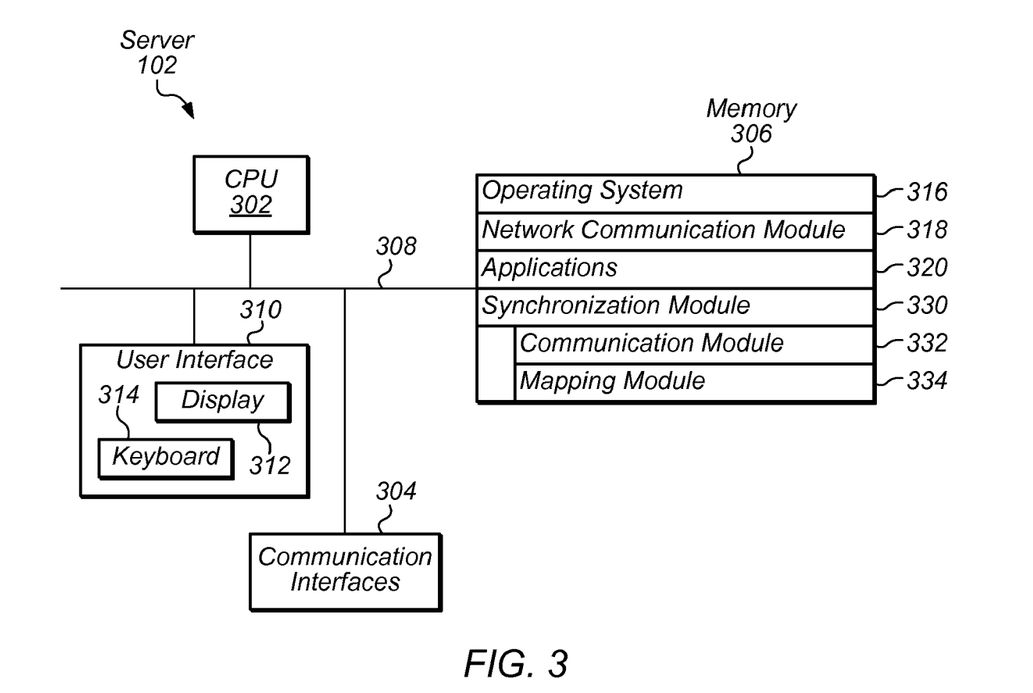
FIG. 3 illustrates an exemplary software architecture according to one embodiment.

FIG. 3—Exemplary Server

FIG. 3 illustrates an exemplary server adapted to implement the present disclosure according to one embodiment. The server 102 may include one or more processing units (CPUs) 302, one or more network or other communications interfaces 304, memory 306, and one or more communication buses 308 for interconnecting these components. The server 102 may include a user interface 310, including a display 312 and a keyboard 314. The memory 306 may include high speed random access memory and may also include non-volatile memory, such as one or more magnetic or optical storage disks. The memory 306 may include mass storage that is remotely located from CPUs 302. The memory 306 may store the following elements, or a subset or superset of such elements:

an operating system 316 that includes procedures for handling various basic system services and for performing hardware dependent tasks;

a network communication module (or instructions) 318 that is used for connecting the server to other computers via the one or more communications interfaces 304 (wired or wireless), such as the Internet, other wide area networks, local area networks, metropolitan area networks, and so on;

applications 320, which may include one or more of e-mail, word processing, spreadsheet, and other office productivity applications, specialized applications for handling graphics, images, audio files, video files, performing numeric calculations and the like, and/or any of numerous other software applications; and a synchronization module 330 for tracking changes to a volume for resynchronization.

In some embodiments, the synchronization module 330 includes the following elements, or a subset or superset of such elements:

a communication module 332 for receiving and transmitting information; and a mapping module 334 for tracking portions of volumes that have been modified.

It will be noted that in various embodiments, one or more modules and/or submodules can be combined together or separated in further modules, as desired.

Figure 4:
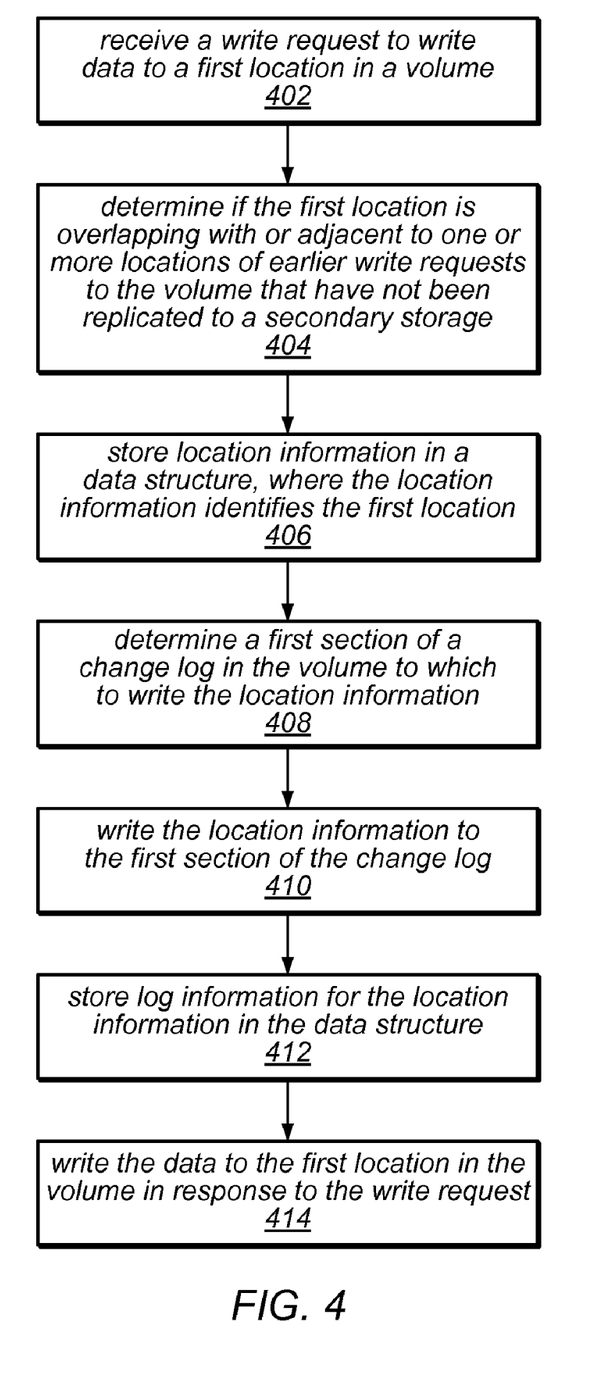
FIG. 4 is a flowchart diagram illustrating operation of an exemplary embodiment.

FIG. 4—Flowchart

FIG. 4 is a flowchart diagram illustrating a method for tracking changes to a volume according to one embodiment. Various embodiments utilize a self-adjusting logging mechanism whose in-memory data structures are contained in the available memory and whose change records are sequentially written to disk. According to some embodiments, such a method may be utilized to track changes to a RAID volume in order to minimize the number of blocks to be resynchronized after a detached disk is reattached to the volume. It will be noted, however, that although many embodiments may be particularly relevant to RAID volumes constructed from disks, the various embodiments may also be applicable to other data redundancy techniques. For example, the data containers can be files, file systems or databases, and these containers can be laid out over virtual storage objects, among other variations. Some embodiments may also be applicable to tracking changes to a volume for asynchronous replication to a redundant secondary (e.g., remote) volume, and/or other redundant data storage systems.

The method may be implemented by a computer system (e.g., server 102 shown in various of the previous Figures, or another computer system). The computer system may include, for example, one or more processors, and a computer readable storage medium which stores program instructions executable by the one or more processors to perform the method. The computer system may also include other hardware and/or components, for example, any of the hardware and components shown in and described with respect to FIG. 2. In some embodiments, the method may be implemented by the synchronization module 330, e.g., including various submodules such as those shown in FIG. 3, executing on server computer system 102. One set of embodiments includes a computer readable storage medium (e.g., an article of manufacture) which stores program instructions executable to implement a method according to the embodiments described herein.

It should be noted that although the description below may set forth steps as being performed in a particular order, various of the steps may be performed in a different order, repeated, or omitted, as desired. One or more additional steps may also be performed, in some embodiments. The method may be performed as described below.

In 402, a write request to write data to a first location in a volume may be received. In some embodiments, the write request may be received by communication module 332 of synchronization module 330. The write request may be received from an application. The application may be any type of application; for example, in some embodiments the application may be one of the applications 320 on the server 102 shown in FIG. 3. In addition, the application may be executing locally or remotely; for example, the application may be located on the computer system implementing the method (e.g., executing on one or more shared processors) or may be located on a different computer system. In other words, the write request may be received from within the computer system implementing the method, or externally, e.g., through a network.

In some embodiments, the volume to which the write request is to be performed may be a RAID volume, or may otherwise utilize one or more redundancy techniques. For example, in some embodiments, a replica of the volume may be maintained, e.g., at a secondary storage location, for backup or other purposes. If one of the disks of the RAID volume is detached (or if the replica volume is to be asynchronously synchronized, or for another reason), it may be desirable to track changes made to the volume. For example, once the detached disk is reattached (or when changes are being replicated to the replica volume), the disks (or volumes) may be resynchronized, and by tracking the changes made to the volume during detachment (or since a previous replication), fewer blocks of the volume may need to be resynchronized.

In 404, it may be determined if the first location is overlapping with or adjacent to one or more locations of earlier write requests to the volume that have not been replicated to a secondary storage. The "secondary storage" may be any kind of redundant storage to which changes of the volume may later need to be resynchronized. For example, the secondary storage may be a detached disk of a RAID volume which is expected to be reattached at some time; or the secondary storage may be a replica volume to which changes may be replicated at some time, among various possibilities.

In some embodiments, the determination may be made by the mapping module 334 of synchronization module 330. The mapping module 334 may include one or more data structures for tracking changes to the volume. For example, the mapping module 334 may include a mapping data structure, which may include a plurality of entries. Each entry in the mapping data structure may include location information identifying a location in the volume to which one or more writes have been performed that have not been replicated to the secondary storage. Thus, determining if the first location is overlapping with or adjacent to one or more locations of earlier write requests may involve examining the mapping data structure to determine if the first locations overlaps with any of the locations identified by the entries in the mapping data structure.

In 406, location information may be stored in a data structure (e.g., the mapping data structure described above). According to some embodiments, the location information may be stored by the mapping module 334 of synchronization module 330. The location information may be stored as a first entry in the mapping data structure, and may identify the first location. According to some embodiments, the mapping data structure may be a balanced tree data structure. Thus in such embodiments, each entry (e.g., node) in the balanced tree may represent a range of blocks that have been changed. For example, a node might store a starting block address (e.g., an offset), and a length of the block range. In some embodiments, the tree may be sorted by the starting block offset, such that adjacent nodes in the tree may identify neighboring locations in the volume. Other types of entries and/or sorting criteria are also possible. In addition, it should be noted that the mapping data structure may alternatively be a different type of data structure; for example, in some embodiments, the mapping data structure may be a hash or skip list data structure, or any of a variety of other types of data structure. Although the mapping data structure is referred to as a single data structure herein, it should be noted that multiple data structures may be used for mapping changes to the volume, if desired.

Depending on the determination made in step 404, the location information stored in the first entry in the data structure may identify a location which includes a larger area in the volume than just the first location. For example, if the first location is overlapping with or adjacent to one or more locations of earlier write requests to the volume, e.g., as identified by one or more entries in the mapping data structure, the location information stored in the first entry may identify a location in the volume which includes the first location and any overlapping or adjacent locations of earlier write requests to the volume.

If the location information stored in the first entry does include locations of earlier writes, e.g., if the location information in the first entry encompasses the locations identified by one or more other (e.g., earlier) entries in the mapping data structure, the earlier entries would be redundant, and may be removed from the data structure. In other words, if a new entry would be overlapping with or adjacent to one or more other entries, the new entry may be enlarged to encompass the locations identified by the one or more other entries, and the one or more other entries may be removed. Thus, the data structure may be updated in such a way that no two entries in the data structure contain overlapping block ranges.

If the first location is not overlapping with or adjacent to the locations identified by any other entries in the mapping data structure, the first entry may identify only the first location. However, in some embodiments the size of the mapping data structure may be limited. For example, a static or dynamically allocated limit may be placed on the size of the mapping data structure, in order to ensure that it fits within memory capacity. Thus, it may sometimes be the case that although the first location does not overlap with (and is not adjacent to) any locations identified by any other entries in the mapping data structure, simply adding a new entry in the mapping data structure may not be possible, e.g., if there is no more room in the mapping data structure for an additional entry. In this case, entries in the mapping data structure may be merged in response to a write request, in order to vacate an entry in the mapping data structure in which to store the location information corresponding to the write request.

Two possibilities for vacating an entry in the mapping data structure include merging the first location information with an existing entry in the mapping data structure, and merging two entries which identify neighboring locations in the volume in order to make room for a new entry. Both of these cases may introduce inaccuracies into the tracked changes. For example, if the merged entries identify nearby but not adjacent locations in the volume, one or more blocks (e.g., blocks between the identified locations) which have not been changed may be marked as changed. In other words, there may be some false positives; however, the mechanism may not introduce any false negatives: if a block has really been changed, it must be marked as changed.

In resynchronization embodiments, it may be possible to apply pending changes to a disk in any order as long as at the end of the process the disk content becomes consistent with the volume content. Thus, at least in this case, it may be acceptable if the change tracking mechanism is not entirely accurate, as long as it identifies all the changed blocks. It will be noted that embodiments may also be used for other purposes (e.g., asynchronous replication to a redundant remote volume) in which write order may be important and/or exact changes may need to be tracked, although such embodiments may also include other data structures and/or mechanisms to assist in tracking changes more exactly.

If it is necessary to vacate an entry in the mapping data structure, a mechanism to determine how to vacate an entry may be used. For example, there may be a way to determine whether to merge two existing entries, or to merge a new (e.g., pending) entry with an existing entry, and which entry or entries should be merged. According to some embodiments, this may be determined based on a distance between locations identified by entries in the mapping data structure. For example, it may be determined that the locations identified by the two entries (either both already existing or the new (pending) entry and an existing entry) to be merged have the smallest distance between them in the volume. By selecting the entries which have the smallest distance between them in the volume as the entries to merge, the mapping data structure may minimize the amount of inaccuracy which is introduced to the change tracking mechanism.

Searching the entire mapping data structure for the entries which are nearest in distance to one another, however, may take a relatively long time. For example, the closest pair in a one dimensional sorted list with n entries can be found in O(n), by scanning the list, since the closest pair of entries will be adjacent in the list. Thus, in some embodiments, a second data structure (e.g., a distance data structure) may be used to assist in determining which entries to merge. In some embodiments, a heap data structure may be used as the distance data structure. For example, a heap data structure may be used to find the closest pair of entries in O(log n), without scanning the mapping data structure.

In some embodiments, a heap data structure may be used as the distance data structure together with a balanced tree data structure (e.g., as described above) as the mapping data structure. Since the block ranges may not overlap in the balanced tree, the distance between neighboring nodes may, in some embodiments, be expressed simply as the number of blocks between them. As an example, let x and y be two neighboring nodes such that x.offset<y.offset. The distance between the nodes may then be defined as y.offset−(x.offset+x.length). In some of these embodiments, the key field for the heap data structure may then be this distance from one node to its higher offset neighbor node. The data field of a node in the heap may embed the balanced tree node. The distance value for the node with the highest offset may be defined as infinite, if desired, as one way to avoid attempting to merge this node with a (non-existent) node with a higher offset. The heap property for the heap data structure may in this case be the min heap property; that is, the parent node in the heap may always be smaller than its children. This may be sufficient to satisfy that the first member of the closest pair of nodes will be always at the root (e.g., may be the first element) of the heap data structure. The other node of the pair can then be located in the balanced tree by visiting the node next to the node pointed by the root of the heap (e.g., if the tree is sorted by the offset address).

It should be noted that, if a distance data structure is used, the distance data structure may also be updated if the mapping data structure is updated. Thus, to continue the above example, if a node is inserted into or removed from the balanced tree, the corresponding node may be inserted into or removed from the heap. Adding or removing a balanced tree node may also cause the distance field of the neighboring node with the smaller offset to be updated. Such a neighboring node may always exist, except when the added or removed node is the node with the smallest offset. This update on the neighboring node can be simply done by removing it from the heap and reinserting it with the new distance value.

It should be noted that instead of a heap data structure, in some embodiments a balanced tree, skip list, an array of lists, or any other data structure (or multiple data structures) may be used as the distance data structure. In some embodiments, a second data structure may not be used at all; for example, in some embodiments, the first data structure (e.g., the mapping data structure) may itself be searched to find a pair of entries to merge.

In 408, a first section of a change log in the volume, to which to write the location information, may be determined. According to various embodiments, this step may be performed by communication module 332 and/or mapping module 334 of synchronization module 330. In some embodiments, in addition to the mapping data structure (e.g., an in-memory data structure) there may also be a means of recording changes to the volume on the volume itself (e.g., on-disk). In some embodiments, the on-disk structure may be an array of change records, e.g., a "change log", in which records identifying locations to which writes have occurred are stored. Each record in the change log may be created so as to reflect an entry in the mapping data structure (e.g., the in-memory data structure). For example, according to some embodiments, each change record may include an offset and length field. The offset field may indicate a starting block address for changed blocks and the length field may indicate the number of changed blocks. According to some embodiments, the change log may have multiple sections, where each section can store a certain number of change records. For example, there might be m sections, each of which might contain n consecutive records. In this case, the number of possible records in the change log would be m times n.

According to some embodiments, one log section may be used at a time. If the current section (e.g., the section that was used to write location information for a most recent previous write operation) is not full, determining the first section may simply include determining that the current section is not full. Once the current section becomes full, one of the m sections may be selected as the next section and that section may be used for recording changes. Thus, if the current section is full, determining the first section may involve selecting a new section as the first section. In some embodiments, change tracking may be paused while the next section is selected.

As described above, the mapping data structure may be updated (e.g., entries may be merged or overlapping or adjacent entries may be replaced by new entries) under various conditions. In some embodiments, the change log may not be updated directly as a result of such updates to the mapping data structure. Thus, as the mapping data structure is updated, one or more records in the change log may no longer reflect current entries in the mapping data structure. For this reason, in such embodiments, the mapping data structure may further include log information indicating a section in the change log in which each entry is reflected. Some embodiments may further include maintaining a counter in memory for each change log section, where each counter indicates how many entries in the mapping data structure are reflected in that change log section. Such a counter may thus be used to determine which change log section has the fewest records that reflect current entries in the mapping data structure. In some embodiments, the first section of the change log may be a section in which the fewest records reflect current entries in the mapping data structure; for example, the section with the lowest counter value may be determined to be the next section. It will be noted that in some cases, a new section may be the same section of the change log as the previous section, e.g., if the previous section still has the fewest records that reflect current entries in the mapping data structure.

Thus, the first section may be a section of the change log in which the fewest records reflect current entries in the mapping data structure. However, the first section may still be full, even if it includes the fewest current records, if out-of-date records are not flushed in sync with updates to the mapping data structure. Thus, in some embodiments, one or more records may be flushed from the first section of the change log before a new record may be added to the change log; for example, any records which no longer reflect current entries in the mapping data structure may be removed from the first section of the change log. According to various embodiments, the out-of-date records may simply be removed (in which case the now-empty records may be out of sequence in the first section), or all records may be removed from the first section and those that reflect current entries in the mapping data structure may be re-logged to the first section of the change log(in which case the now-empty records may be in sequential order, e.g., following the records that have been re-logged).

In 410, the location information may be written to the first section of the change log. The location information may be written to the first available record in the first section of the change log. According to some embodiments, this step may be performed by communication module 332 of synchronization module 330.

In 412, log information for the location information may be stored in the data structure (e.g., the mapping data structure). According to some embodiments, this may be performed by the mapping module 334 of synchronization module 330. As noted above, in some embodiments the mapping data structure may include log information indicating in which section in the change log each entry is reflected. Thus, in such embodiments, log information may be stored in the mapping data structure indicating that the location information is reflected in the first section of the change log.

In 414, the data may be written to the first location in the volume in response to the write request. Writing the data to the volume may be performed by communication module 332 of synchronization module 330. According to some embodiments, the write may be performed on the volume once location information for the write has been stored in-memory and on-disk, so that the portion of the volume which will be changed by the write operation is recorded.

Figure 5A:
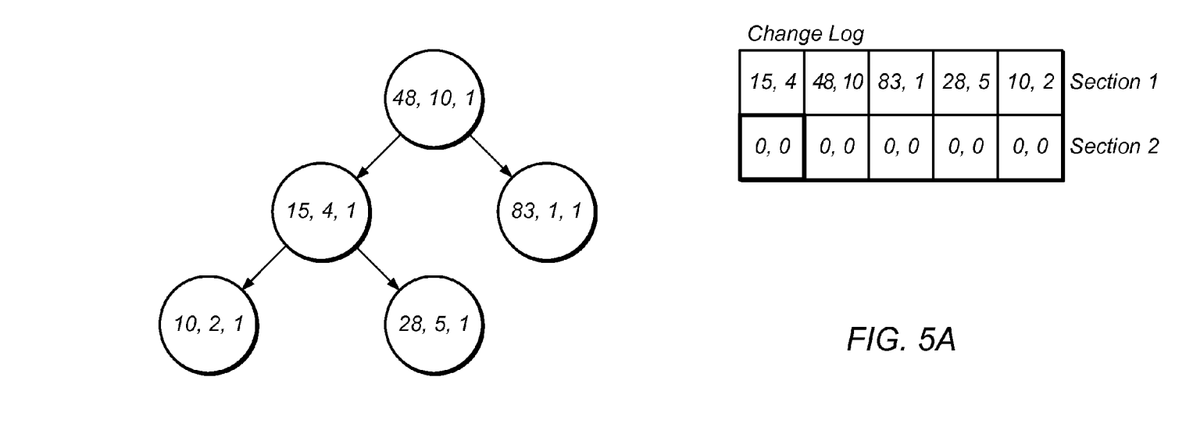
FIGS. 5A-5B illustrate how in-memory and on-disk data structures may be updated according to one embodiment.
Figure 5B:
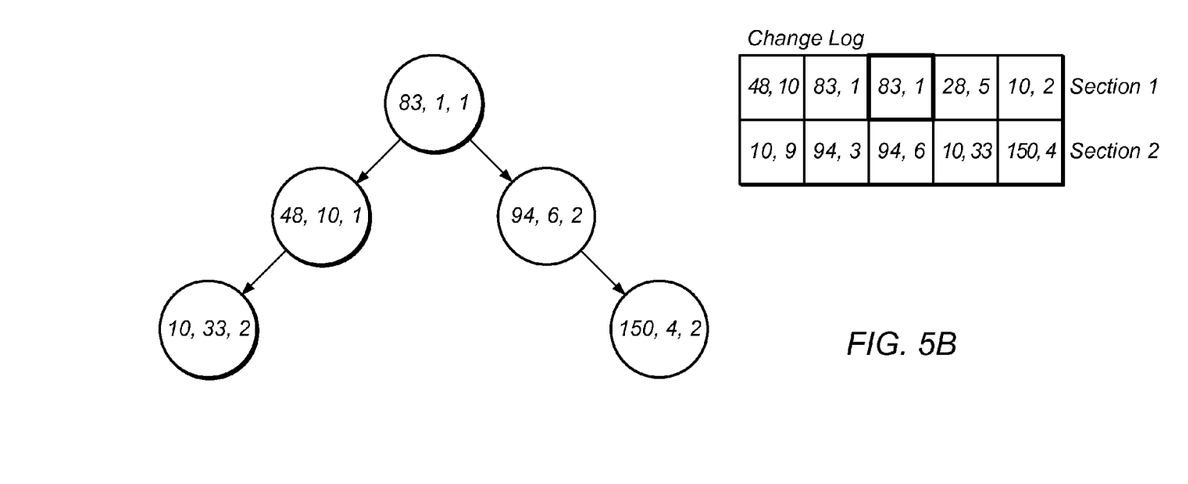

FIGS. 5A-5B—Updating Data Structures

FIGS. 5A-5B illustrate how in-memory and on-disk data structures may be updated according to one set of embodiments. In particular, FIGS. 5A-5B illustrate how a series of write operations might be recorded in a mapping data structure and a change log according to an embodiment in which the mapping data structure is a balanced tree and the change log is an array of change records. The embodiment described with respect to FIGS. 5A-5B is provided as one possible exemplary implementation, and is not intended to represent all possible embodiments. Accordingly, limitations shown in FIGS. 5A-5B and described herein with respect thereto should not be read as limiting to the disclosure as a whole.

FIG. 5A illustrates the balanced tree and change log after five write operations have occurred. In this particular case, the number of sections m in the change log is 2, and the number of records n in each section is 5. Each of these first five write operation is stored as an entry in the balanced tree and as a record in section 1 of the change log. In the embodiments shown, the first two fields in each entry/record represent a starting block and a length (e.g., a number of blocks). Thus, in this case, the first five writes are (15,4), (48,10), (83,1), (28, 5), and (10,2). In addition to this location information, each entry in the balanced tree includes a third field with log information indicating, for each entry, that the entry is reflected by a record in section 1 of the change log.

After the fifth record in section 1 of the change log has been logged, section 1 of the change log is full, and a new section of the change log must be determined. Since section 2 has 0 records which reflect entries in the balanced tree, as compared to section 1 having 5 records which reflect entries in the balanced tree, section 2 will be chosen in the embodiments shown. In addition, since there are no nodes labeled section 2 in the balanced tree, no records need to be re-logged, and the first change record to be used in this section will be the first record in section 2, as indicated by the bold outlining around this record in FIG. 5A.

Now consider subsequent write operations at locations (94, 3), (99,1), and (150,4) in the volume. In this exemplary embodiment, the maximum allocated number of nodes that the balanced tree may contain is also n=5, and so in order to add each entry to the balanced tree, two entries in the balanced tree must be merged. Inserting (94,3) will result in the closest two entries in the tree, (10,2,1) and (15,4,1), being merged. These nodes will be removed from the tree and a new node (10,9,2) will be inserted, along with a corresponding record in section 2 of the change log. The node (94,3,2) can then also be added to the tree, and a corresponding record may be logged in section 2 of the change log. The change record (99,1) will be merged with the existing block range (94,3), to form a new node (94,6,2), and a new log record reflecting this new entry may be added to section 2 of the change log. Finally, inserting (150,4) (and a corresponding log record) will result in merging nodes (10,9,2) and (28,5,1) in the tree and adding a corresponding record to section 2 of the change log. FIG. 5B shows the balanced tree after these three updates have been made. After these updates, section 2 will also be full. At this time, the balanced tree contains two nodes labeled with section 1, and three nodes labeled with section 2, so section 1 will be chosen as the next section. The two nodes labeled with section 1 will be re-logged to section 1, and the next change record will be logged starting from the third record location in this section. FIG. 5B shows the change log after the two section 1 nodes have been re-logged, with the third record of section 1 outlined in bold to mark it as being the next record to be used.

It will be noted that the embodiment of FIGS. 5A-5B represents a relatively simple scenario, and that according to various embodiments, m and n may be any number of sections and records per section, as desired.

Flushing (re-logging) a subset of tree nodes into the new section may require scanning the tree, in the description given above. Although this operation may only be done when the current change log section is full, scanning the entire tree may not be desirable when the number of nodes in the tree is large, since the change tracking may be paused during flush operations. The tree scan can be eliminated by linking the nodes of a section in a list. Thus, m linked lists may be maintained, e.g., one for each section. The nodes then can be flushed to a section by traversing the corresponding list. The number of nodes to be flushed (i.e. the size of the selected list) may be less than or equal to n/m.

Log Recovery

As previously noted, many embodiments of the disclosure may utilize disks (e.g., RAID disks) as storage devices making up a volume. The following section relates to log coherence and recovery in some such embodiments, but is not intended to be limiting to the disclosure as a whole.

On disk subsystems, a single sector can be atomically updated but multiple sector writes are not atomic. A change log section on disk may occupy multiple disk sectors. Care may thus need to be taken when a section is reorganized in place on disk in order to prevent any corruption, and to recover it after a failure event.

Consider a reorganization of a section in which the first s sectors of the section need to be updated, and each sector includes r records. This means that the mapping data structure includes at least (s−1)*r and at most s*r−1 entries for this section when the current section used for logging becomes full. These records may be flushed to their section on disk, and in addition, a null record may be written to denote the end of records in the section. Let t be the total number of records to be written to the section. These t records are a subset of n records in the disk image of this section. If these t records are arranged in a way that the offset of a record in the new image is always less than or equal to the offset of this record in the old image then writing these records multiple sectors at a time (except for the last sector, which also includes the null record, which should be written after the first s−1 sectors are written on disk) will not lead to corruption. In the event of a failure, there can be two copies of some records in a section, which would not impact the correctness of the records.

One possible way to find the position of these records on the disk image is to read the first s sectors of the section from disk to memory before the flush operation.

Another possible way is to label every record in memory with a sequence number maintained at the tree level and increased each time a record is inserted into the tree. The records to be written to a given section on disk may be sorted in ascending order based on this sequence number and flushed to disk in the order in which they are inserted into the tree.

An alternative, and possibly more efficient, method for reorganizing a section in a recoverable way is to use one spare section on disk in addition to the m sections. This spare section may be used to write the new image of a given section. This eliminates the need for reading a section into memory or sorting the records of the tree before each flush because this method does not require in-place writes. When the in-memory records of a section are flushed to the spare section on disk, the old location on disk for this section may be used as the new spare section.

Advantages of the Method

Embodiments of the system and method described herein may provide several advantages over prior change tracking techniques. These advantages may include some or all of the following, depending on the implementation:

The system may be more I/O efficient than previous techniques. It is expected that the system will generate a reduced (possibly minimal) number of I/O requests to persist changed regions on disks. The main reason for this is that in some embodiments, multiple changed regions may always be updated in one I/O request, whereas each changed region may require separate I/O in previous solutions if the I/O pattern is not sequential.

The system may be storage efficient. In other words, the in-memory and on-disk data structure may be configurable to be as large or small as desired, and may be independent of volume size.

The system may be self-adjusting. The data structures may adjust themselves to fit the available memory. This may potentially eliminate disk access for retrieving change blocks (except when the volume is mounted).

In addition, for the above described reasons, the system may be scalable.

In a cluster environment, in some embodiments each node may maintain its own in-memory and on-disk change tracking data structure for each secondary storage and may be able to update these data structures independently. A cluster wide coordination may be required to resynchronize secondary storages by merging these data structures from each node.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

I claim:

1. A computer accessible storage medium comprising program instructions for tracking changes to a volume, the program instructions being executable to:
   receive a write request to write data to a first location in the volume;
   determine if the first location is overlapping with or adjacent to one or more locations of earlier write requests to the volume that have not been replicated to a secondary storage;
   store first location information in a data structure in response to determining that the first location is overlapping with or adjacent to one or more second locations of earlier write requests to the volume that have not been replicated to a secondary storage, wherein the first location information identifies the first location and the one or more second locations;
   wherein said storing the first location information in the data structure removes second location information in the data structure, wherein the second location information identifies the one or more second locations of earlier write requests to the volume that have not been replicated to a secondary storage;
   write the data to the first location in the volume in response to the write request.

2. The computer accessible storage medium of claim 1, wherein the program instructions are further executable to:
   store third location information in the data structure in response to determining that the first location is not overlapping with or adjacent to one or more locations of earlier write requests to the volume that have not been replicated to a secondary storage, wherein the third location information identifies the first location.

3. The computer accessible storage medium of claim 1, wherein the data structure comprises a plurality of entries, wherein each entry comprises location information identifying a location in the volume to which one or more writes have been performed that have not been replicated to a secondary storage.

4. The computer accessible storage medium of claim 3, wherein the program instructions are further executable to:
   store distance information in a second data structure, wherein the distance information in the second data structure indicates distances between locations identified by entries in the first data structure.

5. The computer accessible storage medium of claim 3, wherein the program instructions are further executable to:
   merge two entries in the data structure, wherein the two entries identify a second location and a third location in the volume, wherein said merging comprises removing each entry from the data structure and storing a new entry in the data structure, wherein the new entry identifies a fourth location in the volume, wherein the fourth location comprises the second and third locations.

6. The computer accessible storage medium of claim 5, wherein the merged two entries are determined based on a distance between the second and third locations in the volume.

7. The computer accessible storage medium of claim 5, wherein the program instructions are executable to merge the two entries in the data structure in response to the write request to write data to the first location in the volume in order to vacate an entry in the data structure in which to store location information corresponding to the write request.

8. The computer accessible storage medium of claim 3, wherein each entry also stores log information for the location information in the entry, wherein log information indicates a section of a change log in the volume in which a record reflecting the entry is stored, wherein the change log comprises one or more sections,
wherein the program instructions are further executable to:
determine a first section of the change log to which to write the first location information;
write the first location information to the first section of the change log;
store first log information for the first location information in the data structure, wherein the first log information indicates that the first location information is reflected in the first section of the change log.

9. The computer accessible storage medium of claim 8, wherein the program instructions are further executable to:
if the first section of the change log is full, flush one or more records from the first section of the change log, wherein said flushing comprises removing any records which no longer reflect entries in the data structure from the first section of the change log.

10. The computer accessible storage medium of claim 8, wherein in determining a first section of the change log to which to write the first location information, the program instructions are executable to:
determine that the first section of the change log is a section of the change log in which fewest records reflect entries in the data structure.

11. A computer-implemented method for tracking changes to a volume, the method comprising:
a computer system receiving a write request to write data to a first location in the volume;
the computer system determining if the first location is overlapping with or adjacent to one or more locations of earlier write requests to the volume that have not been replicated to a secondary storage;
the computer system storing first location information in a data structure in response to determining that the first location is overlapping with or adjacent to one or more second locations of earlier write requests to the volume that have not been replicated to a secondary storage, wherein the first location information identifies the first location and the one or more second locations;
wherein said storing the first location information in the data structure removes second location information in the data structure, wherein the second location information identifies the one or more second locations of earlier write requests to the volume that have not been replicated to a secondary storage;
the computer system writing the data to the first location in the volume in response to the write request.

12. The computer-implemented method of claim 11, wherein the method further comprises:
the computer system storing third location information in the data structure in response to determining that the first location is not overlapping with or adjacent to one or more locations of earlier write requests to the volume that have not been replicated to a secondary storage, wherein the third location information identifies the first location.

13. The computer-implemented method of claim 11, wherein the data structure comprises a plurality of entries, wherein each entry comprises location information identifying a location in the volume to which one or more writes have been performed that have not been replicated to a secondary storage.

14. The computer-implemented method of claim 13, wherein the method further comprises:
the computer system storing distance information in a second data structure, wherein the distance information in the second data structure indicates distances between locations identified by entries in the first data structure.

15. The computer-implemented method of claim 13, wherein the program instructions are further executable to:
the computer system merging two entries in the data structure, wherein the two entries identify a second location and a third location in the volume, wherein said merging comprises removing each entry from the data structure and storing a new entry in the data structure, wherein the new entry identifies a fourth location in the volume, wherein the fourth location comprises the second and third locations.

16. The computer-implemented method of claim 15, wherein the merged two entries are determined based on a distance between the second and third locations in the volume.

17. The computer-implemented method of claim 15, wherein said merging the two entries in the data structure is performed in response to the write request to write data to the first location in the volume, in order to vacate an entry in the data structure in which to store location information corresponding to the write request.

18. The computer-implemented method of claim 13, wherein each entry also stores log information for the location information in the entry, wherein log information indicates a section of a change log in the volume in which a record reflecting the entry is stored, wherein the change log comprises one or more sections,
wherein the method further comprises:
the computer system determining a first section of the change log to which to write the first location information;
the computer system writing the first location information to the first section of the change log;
the computer system storing first log information for the first location information in the data structure, wherein the first log information indicates that the first location information is reflected in the first section of the change log.

19. The computer-implemented method of claim 18, wherein the method further comprises:
if the first section of the change log is full, the computer system flushing one or more records from the first section of the change log, wherein said flushing comprises removing any records which no longer reflect entries in the data structure from the first section of the change log.

20. A system for tracking changes to a volume, the system comprising:
one or more processors;
a computer accessible storage medium storing program instructions executable by the one or more processors to:
receive a write request to write data to a first location in the volume;
determine if the first location is overlapping with or adjacent to one or more locations of earlier write requests to the volume that have not been replicated to a secondary storage;
store first location information in a data structure in response to determining that the first location is overlapping with or adjacent to one or more second locations of earlier write requests to the volume that have not been replicated to a secondary storage, wherein the first location information identifies the first location and the one or more second locations;

wherein said storing the first location information in the data structure removes second location information in the data structure, wherein the second location information identifies the one or more second locations of earlier write requests to the volume that have not been replicated to a secondary storage;

write the data to the first location in the volume in response to the write request.

* * * * *